(12) United States Patent
Burry et al.

(10) Patent No.: US 8,150,653 B2
(45) Date of Patent: Apr. 3, 2012

(54) TONER MASS SENSING PRECISION BY NORMALIZATION TO SUBSTRATE REFLECTANCE AND ADJUSTED FOR TONER MASS LEVEL

(75) Inventors: Aaron Michael Burry, Ontario, NY (US); Eric Michael Gross, Rochester, NY (US); Palghat Ramesh, Pittsford, NY (US); Robert E. Rosdahl, Jr., Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 427 days.

(21) Appl. No.: 12/541,702

(22) Filed: Aug. 14, 2009

(65) Prior Publication Data
US 2011/0040524 A1 Feb. 17, 2011

(51) Int. Cl.
*G06F 17/18* (2006.01)
*G01J 3/46* (2006.01)

(52) U.S. Cl. ........................................ 702/179; 356/402

(58) Field of Classification Search .................. 702/179; 356/402
See application file for complete search history.

(56) References Cited

U.S. PATENT DOCUMENTS

| 6,462,821 | B1 | 10/2002 | Borton et al. | |
|---|---|---|---|---|
| 6,941,084 | B2* | 9/2005 | Hamby et al. | 399/64 |
| 2006/0211923 | A1* | 9/2006 | Al-Ali et al. | 600/310 |
| 2009/0129801 | A1 | 5/2009 | Donaldson | |
| 2009/0161111 | A1 | 6/2009 | Ossman et al. | |

OTHER PUBLICATIONS

Improved Precision for Control Patch Relative Reflectance Readings in a Xerographic Print Engine, IP.com Prior Art Database, Jun. 26, 2007.

* cited by examiner

*Primary Examiner* — Aditya Bhat
(74) *Attorney, Agent, or Firm* — Pillsbury Winthrop Shaw Pittman LLP

(57) ABSTRACT

A method of normalizing sensor readings includes receiving a reading from a sensor configured to detect light reflected from a substrate; and normalizing the sensor reading based on a function of sensed mass level on the substrate. A processor for implementing the method is also provided.

13 Claims, 4 Drawing Sheets

TONER MASS SENSING PRECISION BY NORMALIZATION TO SUBSTRATE REFLECTANCE AND ADJUSTED FOR TONER MASS LEVEL

FIELD

This application generally relates to a reflectivity sensor, and in particular, normalizing readings thereof.

BACKGROUND

In xerographic print engines, a tone reproduction curve (TRC) is important for controlling the image quality of the output. An image input to be copied or printed has a specific tone reproduction curve. The image output terminal outputting a desired image has an intrinsic tone reproduction curve. If the image output terminal is allowed to operate uncontrolled, the tone reproduction curve of the image output by the image output terminal will distort the rendition of the image. Thus, an image output terminal should be controlled to match its intrinsic tone reproduction curve to the tone reproduction curve of the image input. An intrinsic tone reproduction curve of an image output terminal may vary due to changes in such uncontrollable variables such as humidity or temperature and the age of the xerographic materials, that is often correlated with the numbers of prints made since the developer, the photoreceptor, etc. were new.

Solid developed mass per unit area (DMA) control is a critical part of TRC control. If the DMA is too low then the images will be too light and customers will be dissatisfied. On the other hand, if the DMA is too high, then other xerographic or image quality problems, such as poor transfer efficiency, fusing defects, or toner scatter on lines, etc., can occur. High DMA will also increase the total cost to owner. Maintaining a constant DMA or a low variation of DMA has always been a challenge in xerographic process controls design.

In addition, in copying or printing systems, such as a xerographic copier, laser printer, or ink-jet printer, a common technique for monitoring the quality of prints is to create a "test patch" of a predetermined desired density. The actual density of the printing material in the test patch can then be optically measured by a suitable sensor to sample along the TRC. In the case of xerographic devices, such as a laser printer, the surface that is typically of most interest in determining the density of printing material thereon is the charge-retentive photoreceptor, on which the electrostatic latent image is formed and subsequently developed by causing toner particles to adhere to areas thereof that are charged in a particular way. There is typically a routine within the operating system of the printer to periodically create test patches of a desired density at predetermined locations on the photoreceptor by deliberately causing the exposure system thereof to charge or discharge as necessary the surface at the location to a predetermined extent. These test patches are used to estimate the deposition of toner on paper in order to control the tone reproduction curve. Often it is not desirable to use customer media (paper, etc.) for control, and so the measurements are frequently obtained by directly measuring the developed patches on the photoreceptor.

To reduce noise, sensor to sensor variability, and other measurement errors, sensor readings are typically normalized. However, conventional normalizing techniques may not be able to adequately alleviate or reduce measurement errors.

SUMMARY

According to one embodiment, a method of normalizing sensor readings, the method comprises: receiving a reading from a sensor configured to detect light reflected from a substrate; and normalizing the sensor reading based on a function of sensed mass on the substrate.

According to another embodiment, a processor for normalizing readings of a sensor that comprises: an illuminator configured to emit a beam of light at a point on the substrate, thereby producing a generally specular reflectance at a specular angle and generally diffuse reflectance at a diffuse angle; a specular detector configured to detect the generally specular reflectance at the specular angle; and a diffuse detector configured to detect the generally diffuse reflectance at the diffuse angle. The processor is configured to receive a reading from the specular detector; and normalize the specular sensor reading based on a function of sensed mass on the substrate.

According to yet another embodiment, a computer-readable storage medium comprises computer-readable instructions stored therein that when executed by a processor are configured to implement a method for normalizing sensor readings.

Other features of one or more embodiments of this disclosure will seem apparent from the following detailed description, and accompanying drawings, and the appended claims.

BRIEF DESCRIPTION OF THE DRAWINGS

Embodiments of the, present disclosure will now be disclosed, by way of example only, with reference to the accompanying schematic drawings in which corresponding reference symbols indicate corresponding parts, in which.

DETAILED DESCRIPTION

According to one or more embodiments, a methodology is disclosed that normalizes the sensor readings of a substrate as a function of sensed mass per unit area on a substrate. The normalization may be any function that weighs the corrections as a function of sensed mass per unit area level on the substrate.

The term "mass" as used herein, refers to toner or ink provided on the substrate. It may be expressed as the amount of toner or ink per unit area (e.g., $mg/cm^2$).

In some implementations, the sensor may be reflectivity based, such as, for example, an Enhanced Toner Area Coverage (ETAC) sensor, as disclosed in U.S. Pat. No. 6,462,821, and herein incorporated by reference. It will be appreciated that other optical sensing devices may be similarly used including compact image sensors, or the like. At a minimum, the sensor may include a detector configured to detect light, and in particular, light reflected from a substrate. The light impinging upon and reflected from the surface of the substrate may be any electromagnetic energy, including ultraviolet (UV), visible, and infrared (IR) radiation.

Figure 1:
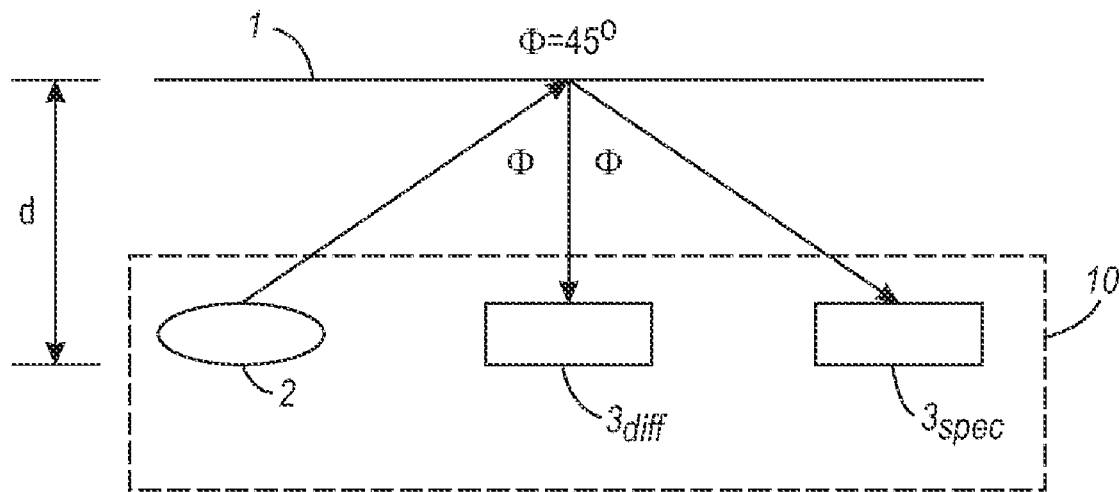
FIG. 1 is a schematic of one exemplary reflectivity sensor which may be used for measuring the reflectivity of a substrate in accordance with an embodiment.

FIG. 1 is a schematic of one exemplary specular reflectivity sensor 10 used for measuring the reflectivity of a substrate which may be used in accordance with an embodiment. The sensor 10 may contain an illuminator 2, such as a light emitting diode (LED), and two or more detectors: a diffuse detector $3_{\mathit{diff}}$ and a specular detector $3_{\mathit{spec}}$.

When the sensor 10 is located at the optimal distance d from the substrate 1, the illuminator 2 may typically be at some angle other than the angle of incidence respect to diffuse detector $3_{\mathit{diff}}$ and at the same angle of incidence with respect to the specular detector $3_{\mathit{spec}}$. The illuminator 2 is configured to emit a beam of light at a point on the substrate thereby producing a generally specular reflectance at a specular angle and generally diffuse reflectance. The diffuse detector $3_{\mathit{diff}}$ is configured to detect the generally diffuse reflectance at an angle offset from the specular angle, which is referred to as the diffuse angle. The specular detector $3_{\mathit{spe}}$ is configured to detect the generally specular reflectance at the specular angle.

While specular light is reflected only at 90° (for a 45° angle of incidence $\Phi$), diffuse light is reflected over a wide range of angles, including the specular angle. The specular reflection, which is detected by the specular detector $3_{\mathit{spec}}$, is sensitive to the area covered by the toner is used to control the Tone Reproduction Curve (TRC), and hence the colors printed by the printing press. In FIG. 1, the angle of incidence $\Phi$ is shown to be 45°; however, it will be appreciated that in other implementations, the angle of incidence may be, for instance, 30°, 15°, or other angles.

Figure 2:
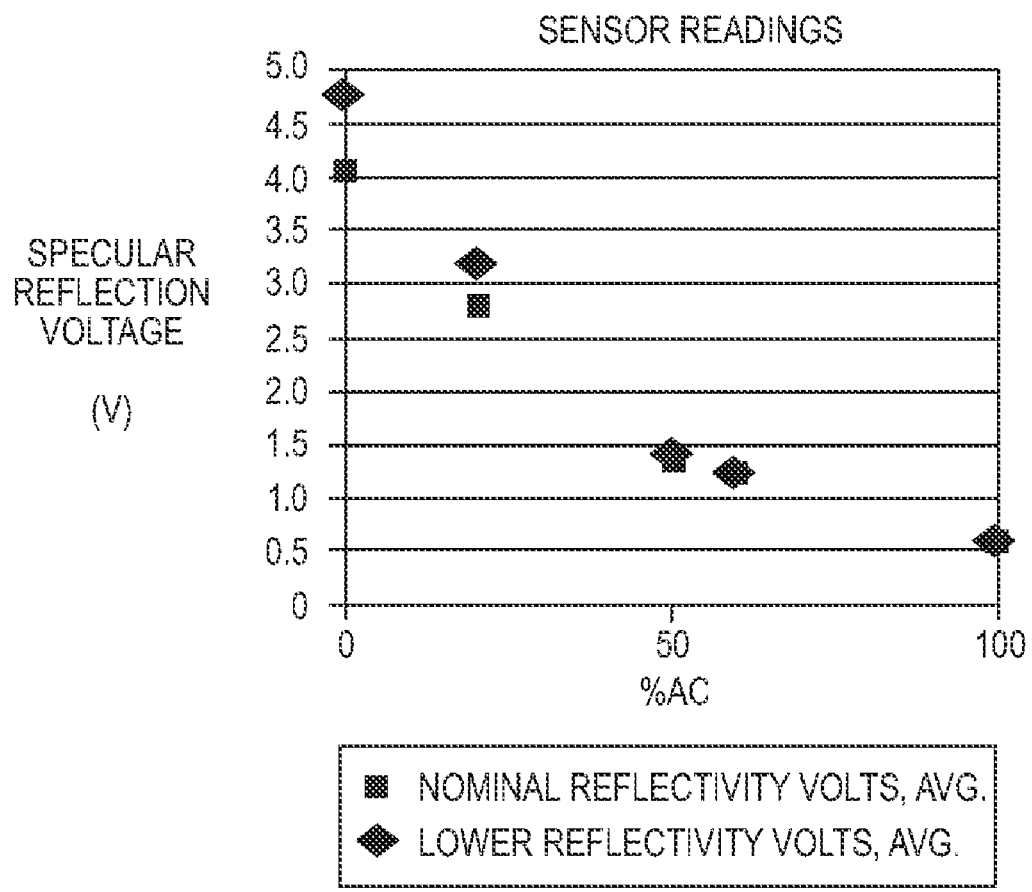
FIG. 2 shows a plot of exemplary specular voltage responses of a sensor looking at two sets of test patches of substantially the same toner mass at two different locations on an intermediate transfer belt (ITB) of a printer.

FIG. 2 shows a plot of exemplary specular voltage response of a sensor looking at two sets of test patches of substantially the same mass at two different locations on an intermediate transfer belt (ITB) of a printer. The data was obtained using a print engine configured to render an image with black (K) toner. Sensor measurements were taken from the ITB of the printer.

The sensor output was recorded for the two sets of halftone test patches on the belt. The test patches ranged from 0 to 100% area coverage (AC). One set of patches ("Lower") was rendered on a portion of the ITB artificially aged by gently abrading the surface with emery cloth, to simulate a slightly lower, but substantially the same reflectivity, than the control ("Nominal") set of patches. For a given area coverage, the Nominal and Lower reflectivity patches are assumed to have the same mass and were placed within approximately 1 cm of each other.

As the plot shows, the specular sensor readings for the two set of patches, Nominal and Lower reflectivities, were noticeably different. These readings are taken adjacent to each other but the underlying substrate reflectivities are at the greatest variance, i.e., approximately 0.5 volts at 0% AC. For instance, for the Nominal reflectivity patch corresponding to 0% AC, the specular detector output was about 4.6 V. And for the Lower reflectivity patch the specular detector output was about 4.1 V. As also shown in FIG. 2, the sensor readings generally differ at low masses but tend to converge at higher mass levels.

It is known to remove optical reflective sensor error due to localized variations in the substrate and noise by normalizing sensor readings with respect to a "clean" sensor reading, i.e., a measurement of the substrate having no mass thereupon. The "clean" sensor reading is variable as a function of sensor's position with respect to a location x with along the substrate in a process direction, and is commonly referred to as the "specular reflectivity signature." The substrate may be either a photoreceptor (P/R), intermediate transfer belt, or other media as known in the printing arts for holding an image. While the term "belt" is used herein, it will be appreciated that the embodiments disclosed herein may be applicable to other types of photoreceptor and transfer elements, such as drums, rollers, or the like. Thus, any reference to "belt" should not be construed as limiting.

For instance, it is known to normalize specular reflectivity sensors according to Equation 1, as follows:

$$\text{Normalized Reading} = \frac{V_{\mathit{spec\_read}}(x) - DarkOffset}{V_{\mathit{spec\_Clean\_read}}(x) - DarkOffset} \quad (1)$$

In Equation 1, DarkOffset is the sensor's bias (i.e., the Specular detector's output reading when no light is received by the detector). DarkOffset is a constant and is a parameter of the sensor itself. Thus, it may differ from sensor to sensor. Vspec_read is the specular detector reading of the substrate and Vspec_Clean_read is the "clean" specular detector reading of the substrate having no mass. These sensor readings may be in units of voltage.

When there is no mass on the substrate, the Vspec_Clean_read output may vary due to localized variations of the underlying substrate, such as scratches, wear, oxidation, etc. On the other hand, when mass is present on the substrate, the specular detector's output Vspec_read varies because of mass variations, as well as, the localized variations which is a source of noise. Normalization attempts to address this noise.

Figure 3:
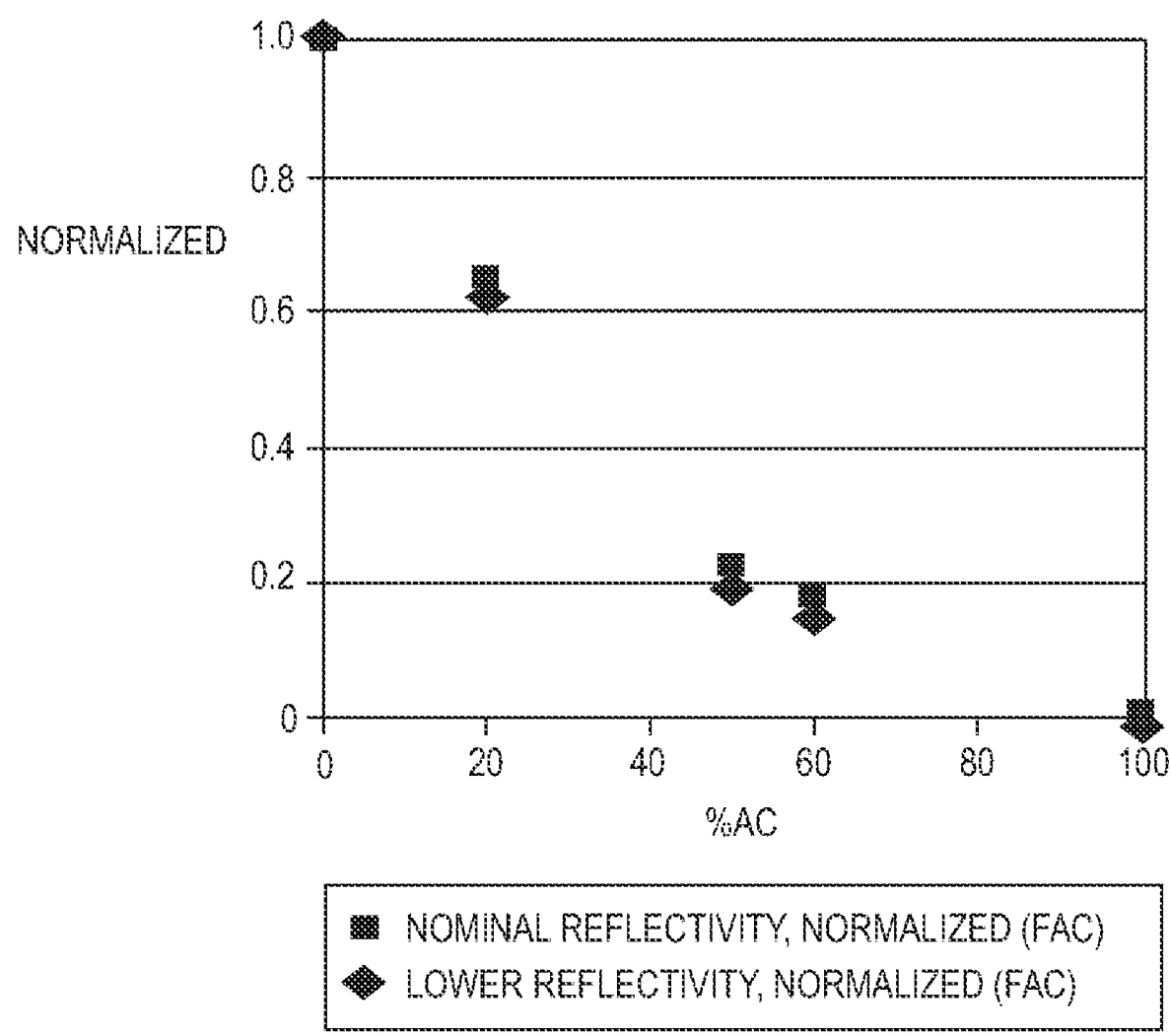
FIG. 3 shows a plot of the sensor readings for each set of test patches after a conventional normalization method using Equation 1.

FIG. 3 shows a plot of the sensor readings for each set of test patches after a conventional normalization method using Equation 1. The normalized units are in fractional area coverage (FAC) ranging from 0 to 1.0 (0 to 100%).

At low mass levels, this conventional normalization process is generally effective. In fact, the data for the two set of patches are in agreement at around 0% AC. However, the mid-tone normalized values, for instance 20-60% AC, shows greater variability. At high masses, for instance, around 100% AC the errors become reduced. This is because the numerator of Equation 1 approaches 0. Ideally, for the same mass, all sensor readings should be in agreement regardless of mass.

However, as Table 1 shows, errors ranged from about 0 to 2.85 L* (CIE L*A*B*) for the test patches using the conventional normalization method of Equation 1.

TABLE 1

Errors with Conventional Normalization

| AC % | L* Units |
|---|---|
| 0.00 | 0.00 |
| 20.00 | 1.74 |
| 50.00 | 2.60 |
| 60.00 | 2.85 |
| 100.00 | 0.23 |

This is because, in Equation 1 above, the conventional normalization factor, $$\frac{1}{V_{\mathit{spec\_Clean\_read}}(x) - DarkOffset},$$

is not a function of mass.

Accordingly, an improved, modified normalization methodology is proposed that normalizes the sensor readings as a function of sensed mass on the substrate. The modification may be any function that weighs the corrections as a function of sensed mass level.

Unlike the conventional method for normalization of Equation 1, the modification reduces the normalization correction for larger mass, and especially mid-tones. The rationalization for this approach is based on the premise that at larger mass, the underlying substrate variation should contribute less and less to the sensor output since it is being obscured by the presence of toner.

Equation 2 is one exemplary sensor reading normalization formula according to an embodiment.

$$\text{Modified Normalization Reading} = \frac{V_{spec\_read}(x) - DarkOffset}{V_{spec\_Clean\_read}(x) + \left(\frac{V_{spec\_read}(x)}{V_{spec\_Clean\_read}(x)}\right)^{\beta} \delta(x) - DarkOffset} \quad (2)$$

Equation 2 provides an additional factor in the denominator of Equation 1. This additional factor is based upon a function δ(x) which characterizes the mass deviation at location x from an averaged "clean" sensor reading $\overline{V}_{spec\_Clean\_average}(x)$. In some implementations, $\overline{V}_{spec\_Clean\_avarage}(x)$ may be determined by measuring the substrate signature, i.e., around and/or over the surface, of the substrate. This may be performed, for example, during a calibration routine of a printer.

This deviation function δ(x) takes into account the deviation of the sensor's clean reading from the averaged "clean" sensor reading $\overline{V}_{spec\_Clean\_average}(x)$.

In one implementation, the deviation function δ(x) may be defined according to Equation (3), as follows:

$$\delta(x) = V_{spec\_read}(x) - \overline{V}_{spec\_Clean\_average}(x) \quad (3)$$

where $$\overline{V}_{spec\_Clean\_average}(x) = \frac{1}{n}\sum_{i=1}^{n} V_{spec\_Clean\_read}(x_i)$$

The deviation function δ(x) may be scaled by a factor $$\frac{V_{spec\_read}(x)}{V_{spec\_Clean\_read}(x)},$$

which represents the relative intensity of the sensor reading with respect to the "clean" sensor reading and is a function of mass due to the numerator term. This scaling factor assumes a value of 1.0 at 0% AC mass and decreases the values of δ(x) monotonically as its numerator term $V_{spec\_read}(x)$ falls below the denominator's value $V_{spec\_Clean\_read}(x)$ with increasing mass.

The rate of decrease may be modified by a exponent β. Setting the exponent β to 0, for instance, reduces Equation 2 to Equation 1.

For Equation 2, empirical data shows that setting the exponent β to be greater than 0 and up to about 1.9 yields improved sensor reading performance. In one implementation, to minimize the error squared sum between the Nominal and Lower reflectivities along the ITB, the exponent β may be set to 0.7. However, for different sensors, the value of exponent β may vary.

As shown in Table 2, errors ranged from about 0 to 1.09 L* units (CIE L*A*B*) for the test patches using the modified normalization method of Equation 2.

TABLE 2

| Modified Normalization Errors | |
|---|---|
| AC % | L* Units |
| 0.00 | 0.00 |
| 20.00 | −0.88 |
| 50.00 | 0.53 |
| 60.00 | 1.09 |
| 100.00 | 0.17 |

This is a significant improvement over the results shown in Table 1 using the conventional approach, which had errors of up to 2.85 L*.

Figure 4:
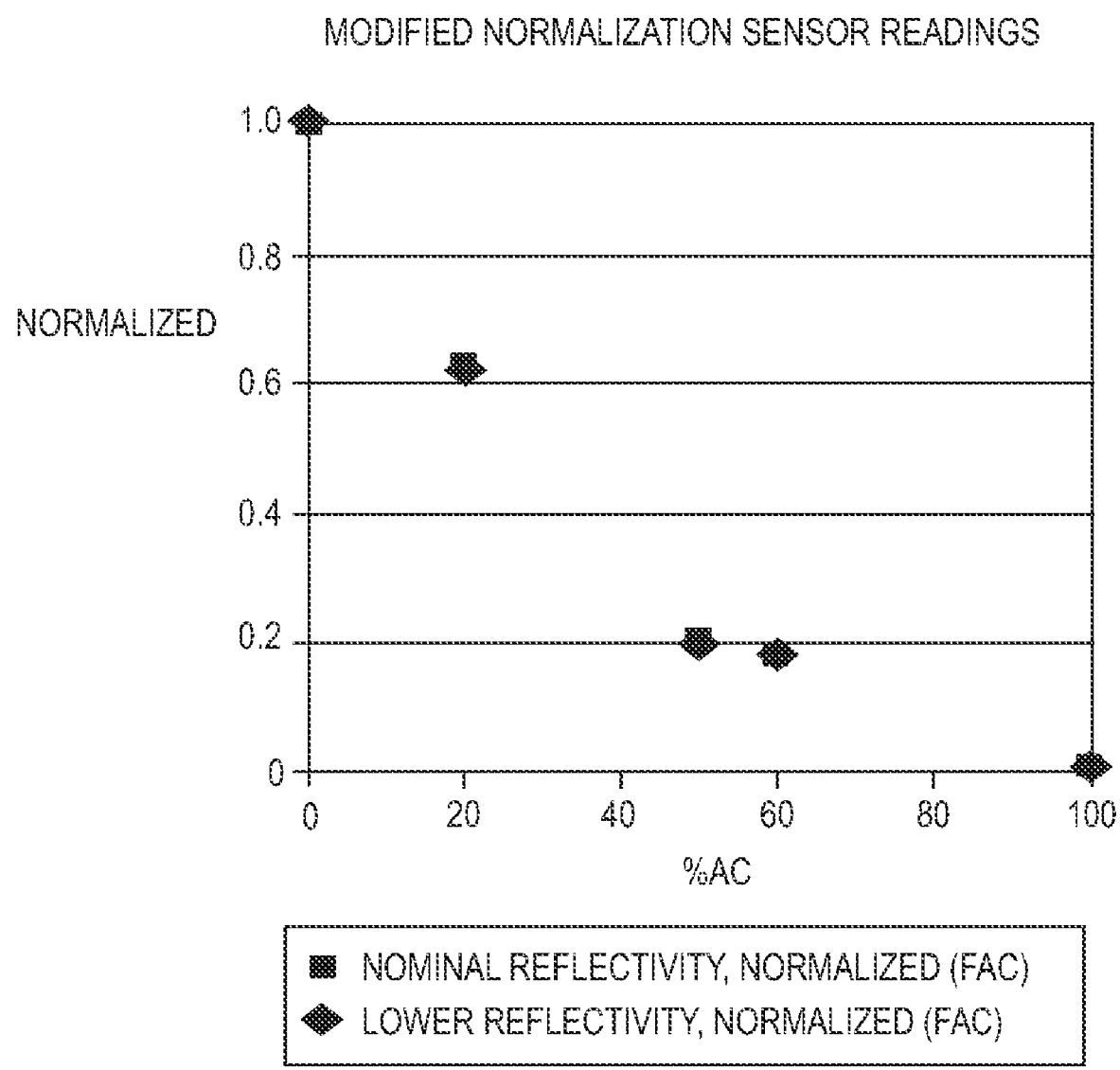
FIG. 4 shows a plot of the sensor readings for each set of test patches after normalization using the modified normalization method of Equation 2 in accordance with an embodiment.

FIG. 4 shows a plot of the normalized sensor readings for each set of test patches using the modified normalization method of Equation 2. As will be appreciated, the normalized sensor data for the Nominal and Lower reflectivity test patches are much closer in value over all area converges.

Figure 5:
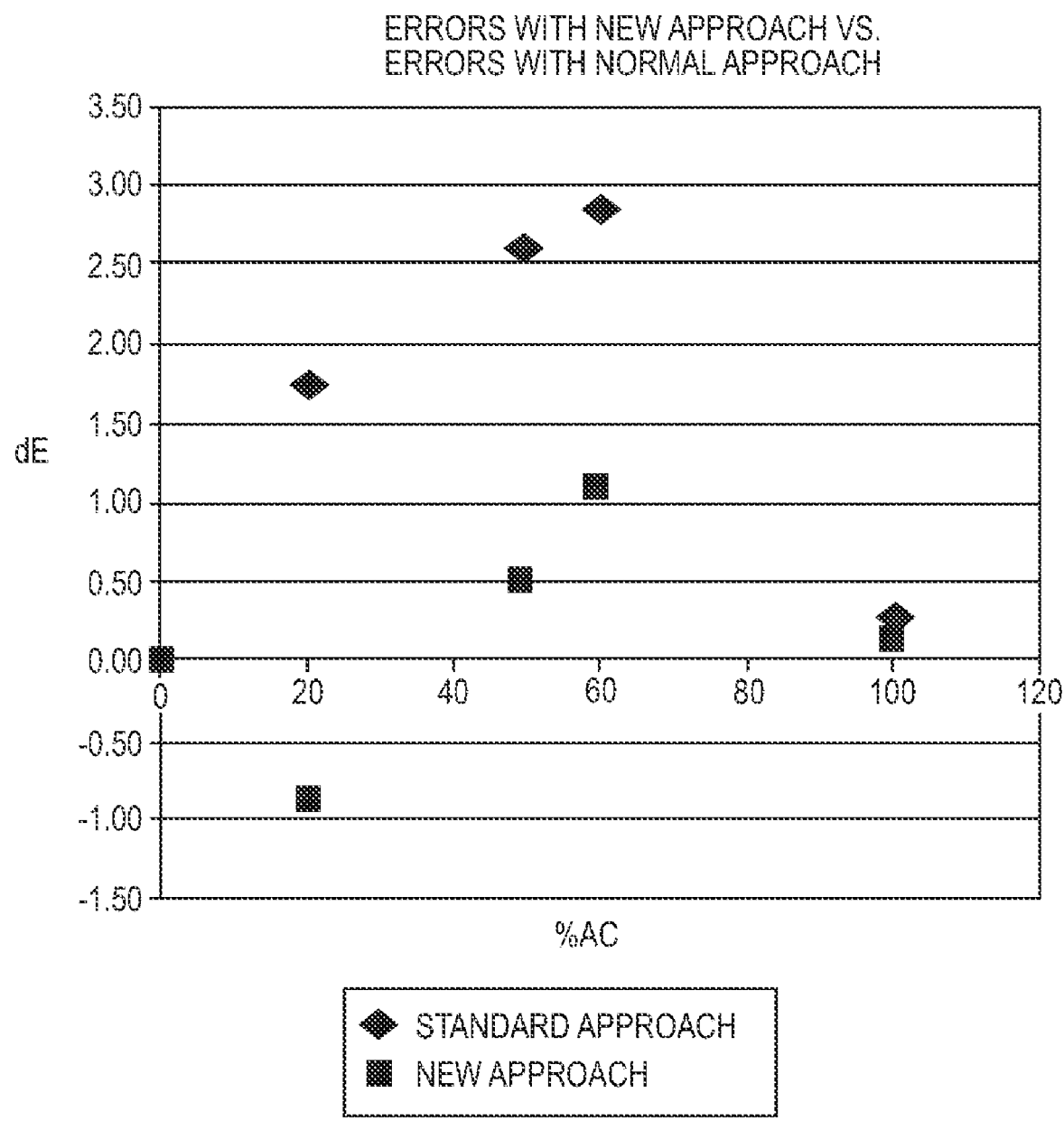
FIG. 5 shows a plot of the relative errors utilizing the modified normalization method compared to the conventional normalization method.

FIG. 5 shows a plot of the relative errors utilizing the modified normalization method compared to the conventional normalization method. The conventional approach yields errors of approximately 3 deltaE-1976 (dE), while the modified approach yields errors of approximately 1 dE. The errors were estimated from reflectivity errors and are in units of L*.

Equation 2 should not be construed as being limited. Any methodology may be utilized that normalizes the sensor reading as a function of sensed mass level. For instance, the modification may be any function that provides for normalization correction as a function of sensed mass level. Weighting factors may also be considered. The function of Equation 2 is one example; other functions may exist. Toner properties, mass ranges, and the underlying substrate may all have an impact on determining the best functional form.

A processor (not shown) may be provided to process the reflectance data detected by the specular and diffuse sensor channels, normalize the sensor readings, or both. It may be dedicated hardware, like a application-specific integrated circuit (ASIC) or field-programmable gate array (FPGAs), software, or a combination of dedicated hardware and software. For the different normalization methods, the programming may vary.

According to yet another embodiment, associated software may be used in conjunction with the sensor to perform normalization of sensor readings. For instance, a computer-readable storage medium may include computer-readable instructions stored therein that when executed by a processor are configured to implement a method for normalizing sensor readings.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method of normalizing sensor readings, the method comprising:
   (i) receiving a reading from a sensor configured to detect light reflected from a substrate; and
   (ii) normalizing the sensor reading, using a processor, based on a function of sensed mass on the substrate
   wherein the normalized function is defined as:

$$\frac{V_{spec\_read}(x) - DarkOffset}{V_{spec\_Clean\_read}(x) + \left(\frac{V_{spec\_read}(x)}{V_{spec\_Clean\_read}(x)}\right)^\beta \delta(x) - DarkOffset},$$

where:
   x is a position of the substrate in a process direction;
   Vspec_read(x) is the sensor's reading;
   DarkOffset is the sensor's bias;
   Vspec_Clean_read(x) is a sensor reading taken of the substrate with no mass on the substrate;
   β is an exponent greater than 0; and
   δ(x) is a function of mass deviation on the substrate.

2. The method according to claim 1, wherein δ(x) is defined as $$V_{spec\_read}(x) - \overline{V}_{spec\_Clean\_average},$$

where $$\overline{V}_{spec\_Clean\_average} = \frac{1}{n} \sum_{i=1}^{n} V_{spec\_Clean\_read}(x).$$

3. The method according to claim 1, wherein β is experimentally optimized.

4. The method according to claim 1, wherein β is about 0.7.

5. The method according to claim 1, wherein the sensor comprises:
   an illuminator configured to emit a beam of light at a point on the substrate, thereby producing a generally specular reflectance at a specular angle and generally diffuse reflectance at a diffuse angle;
   a specular detector configured to detect the generally specular reflectance at the specular angle; and
   a diffuse detector configured to detect the generally diffuse reflectance at the diffuse angle.

6. A processor for normalizing readings of a sensor, the sensor comprising:
   an illuminator configured to emit a beam of light at a point on the substrate, thereby producing a generally specular reflectance at a specular angle and generally diffuse reflectance at a diffuse angle;
   a specular detector configured to detect the generally specular reflectance at the specular angle; and
   a diffuse detector configured to detect the generally diffuse reflectance at the diffuse angle,
   wherein the processor is configured to:
   (i) receive a reading from the specular detector; and
   (ii) normalize the specular sensor reading based on a function of sensed mass on the substrate
   wherein the normalized function is defined as:

$$\frac{V_{spec\_read}(x) - DarkOffset}{V_{spec\_Clean\_read}(x) + \left(\frac{V_{spec\_read}(x)}{V_{spec\_Clean\_read}(x)}\right)^\beta \delta(x) - DarkOffset},$$

where:
   x is a position of the substrate in a process direction;
   Vspec_read(x) is the sensor's readng;
   DarkOffset is the sensor's bias;
   Vspec_Clean_read(x) is a sensor reading taken of the substrate with no mass on the substrate;
   β is an exponent greater than 0; and
   δ(x) is a function of mass deviation on th substrate.

7. The processor according to claim 6, wherein δ(x) is defined as $$V_{spec)read}(x) - \overline{V}_{spec\_Clean\_average},$$

where $$\overline{V}_{spec\_Clean\_average} = \frac{1}{n} \sum_{i=1}^{n} V_{spec\_Clean\_read}(x).$$

8. The method according to claim 6, where β is experimentally optimized.

9. The method according to claim 6, wherein β is about 0.7.

10. A non-transitory computer-readable storage medium comprising computer-readable instructions stored therein that when executed by a processor are configured to implement a method for normalizing sensor readings, the method comprising:
   (i) receiving a reading from a sensor configured to detect light reflected from a substrate; and
   (ii) normalizing the specular sensor reading based on a function of sensed mass on the substrate
   wherein the normalized function is defined as:

$$\frac{V_{spec\_read}(x) - DarkOffset}{V_{spec\_Clean\_read}(x) + \left(\frac{V_{spec\_read}(x)}{V_{spec\_Clean\_read}(x)}\right)^\beta \delta(x) - DarkOffset},$$

where:
   x is a position of the substrate in a process direction;
   Vspec_read(x) is the sensor's reading;
   DarkOffset is the sensors bias;
   Vspec_Clean_read(x) is a sensor reading taken of the substrate with no mass on the substrate;
   β is an exponent greater than 0; and
   δ(x) is a function of mass deviation on the substrate.

11. The method according to claim 10, wherein δ(x) is defined as $$V_{spec\_read}(x) - \overline{V}_{spec\_Clean\_average},$$

where $$\overline{V}_{spec\_Clean\_average} = \frac{1}{n}\sum_{i=1}^{n} V_{spec\_Clean\_read}(x).$$

12. The method according to claim 10, where β is experimentally optimized.

13. The method according to claim 10, wherein β is about 0.7.

\* \* \* \* \*